United States Patent
Wu et al.

(10) Patent No.: US 12,379,514 B2
(45) Date of Patent: Aug. 5, 2025

(54) SYSTEM AND METHOD FOR ELASTIC FULL WAVEFORM INVERSION AND IMAGING

(71) Applicant: CGG SERVICES SAS, Massy (FR)

(72) Inventors: Zedong Wu, Katy, TX (US); Zhiyuan Wei, Sugarland, TX (US); Zhigang Zhang, Houston, TX (US); Jiawei Mei, Katy, TX (US); Rongxin Huang, Katy, TX (US); Ping Wang, Sugarland, TX (US)

(73) Assignee: CGG SERVICES SAS, Massy (FR)

( * ) Notice: Subject to any disclaimer, the term of this patent is extended or adjusted under 35 U.S.C. 154(b) by 343 days.

(21) Appl. No.: 18/145,115

(22) Filed: Dec. 22, 2022

(65) Prior Publication Data
US 2023/0288590 A1      Sep. 14, 2023

Related U.S. Application Data

(60) Provisional application No. 63/319,697, filed on Mar. 14, 2022.

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 2210/614* (2013.01)

(58) Field of Classification Search
CPC ... G01V 1/282; G01V 1/303; G01V 2210/614
See application file for complete search history.

(56) References Cited

U.S. PATENT DOCUMENTS

| | | | | |
|---|---|---|---|---|
| 8,379,482 B1* | 2/2013 | Khare | ...................... | G01V 1/28 367/75 |
| 8,843,353 B2* | 9/2014 | Posamentier | .......... | G01V 20/00 703/2 |
| 10,816,687 B2* | 10/2020 | Sain | ....................... | G01V 1/306 |
| 11,048,001 B2 | 6/2021 | Zhang et al. | | |

OTHER PUBLICATIONS

Albert Tarantola, "Inversion of seismic reflection data in the acoustic approximation," Geophysics, Aug. 1984, vol. 49, No. 8, pp. 1259-1266.

(Continued)

*Primary Examiner* — Elias Desta
(74) *Attorney, Agent, or Firm* — PATENT PORTFOLIO BUILDERS PLLC

(57) ABSTRACT

A method for seismic imaging of a subsurface using a full waveform inversion, FWI, includes the steps of obtaining an initial P-velocity model that describes how a seismic wave propagates through the subsurface, generating an S-velocity model based on the initial P-velocity model, generating an elastic synthetic dataset p based on the initial P-velocity model and the S-velocity model, receiving a recorded seismic dataset d of the subsurface, updating the P-velocity model based on a comparison between the synthetic dataset p and the recorded seismic dataset d, updating a reflectivity at various locations in the subsurface based on the updated P-velocity model, and generating an image of the subsurface based on the reflectivity.

20 Claims, 12 Drawing Sheets

(56) References Cited

OTHER PUBLICATIONS

Bertram Nolte et al., "Salt velocity model building with FWI on OBN data: Example from Mad Dog, Gulf of Mexico," SEG International Exposition and 89th Annual Meeting, 2019, pp. 1275-1279.

Óscar Calderon Agudo et al., "Mitigating elastic effects in marine 3-D full-waveform inversion," Geophysical Journal International, 2020, vol. 220, pp. 2089-2104.

Peter Mora et al., "Elastic versus acoustic inversion for marine surveys," Geophysical Journal International, Apr. 2018, vol. 214, pp. 596-622.

Ping Wang et al., "Full-waveform inversion for salt: A coming of age," The Leading Edge, Mar. 2019, pp. 204-213.

R.-E. Plessix, "A review of the adjoint-state method for computing the gradient of a functional with geophysical applications," Geophysics Journal International, 2006, vol. 167, pp. 495-503.

René-Édouard Plessix et al., "Low-frequency, long-offset elastic waveform inversion in the context of velocity model building," The Leading Edge, May 2021, pp. 342-347.

Rongxin Huang et al., "Full-waveform inversion for full-wavefield imaging: Decades in the making," The Leading Edge, May 2021, pp. 324-334.

Scott Michell et al., "Automatic Velocity Model Building with Complex Salt: Can Computers Finally Do an Interpreter's Job?," SEG International Exposition and 87th Annual Meeting, 2017, pp. 5250-5254.

Xukai Shen et al., "Salt model building at Atlantis with Full Waveform Inversion," SEG International Exposition and 87th Annual Meeting, 2017, pp. 1507-1511.

Zhigang Zhang et al., "Correcting for salt misinterpretation with full-waveform inversion," SEG International Exposition and 88th annual Meeting, 2018, pp. 1143-1147.

Llya Tsvankin, "Anisotropic parameters and P-wave velocity for orthorhombic media," Geophysics, Jul.-Aug. 1997, vol. 62, No. 4, pp. 1292-1309.

Zhigang Zhang et al., "FWI Imaging: Full-wavefield imaging through full-waveform inversion," 2020 Society of Exploration Geophysicists SEG International Exposition and 90th Annual Meeting, 2020, pp. 656-660.

\* cited by examiner

SYSTEM AND METHOD FOR ELASTIC FULL WAVEFORM INVERSION AND IMAGING

BACKGROUND OF THE INVENTION

Technical Field

Embodiments of the subject matter disclosed herein generally relate to processing acquired seismic data using a subsurface model for the purpose of identifying and/or characterizing subsurface resources as hydrocarbons, minerals, and geothermal water for exploitation, and more particularly, to develop a new subsurface model that uses elastic full waveform inversion for more accurately detecting the location of one or more of these resources.

Discussion of the Background

Developing onshore and offshore oil and gas production fields has found renewed interest in recent years. Due to the high cost of well drilling, those undertaking it rely heavily on land or marine seismic surveys and other geological investigations for surveying the subsurface before selecting drilling locations so as to minimize the risk of a dry well. In addition, the seismic surveys may be used for determining subfloor locations for carbon capture and sequestration (which may be linked to the oil and gas development operations), estimate potential of geothermal water reserves, and/or identify/estimate the presence/absence of other subsurface resources as minerals. A seismic survey generates profiles (images) of the geophysical structure under the seafloor by acquiring seismic data with plural sensors distributed above the subsurface of interest and then processing the seismic data to generate an image of the subsurface. While these profiles do not provide an accurate location of oil and gas reservoirs, those trained in the field may use them to estimate the presence or absence of oil and/or gas.

One way for processing the seismic data for generating an image of the subsurface is the full-waveform inversion (FWI). The FWI was introduced by Laily (Lailly, P., 1983, The seismic inverse problem as a sequence of before stack migrations: Conference on Inverse Scattering: Theory and Application, SIAM, 206-220.) and Tarantola (Tarantola, A., 1984, Inversion of seismic reflection data in the acoustic approximation: GEOPHYSICS, 49(8), 1259-1266) and provides a natural and elegant way to automatically build the Earth model m through inversion of the recorded full-wavefield data d. The recorded full-wavefield data d includes the primary reflections. However, successful FWI application in areas of large impedance contrasts between adjacent subsurface layers, such as salt, has remained challenging for more than thirty years.

It was only recently that FWI finally fulfilled its promise for salt velocity model update and led to significant uplifts in subsalt imaging, despite its acoustic nature (see, for example, [1] to [5]). However, obtaining an accurate salt model does not solve the complete puzzle yet; subsalt imaging is still often troubled by illumination issues that are difficult to resolve with conventional migration methods that only use primary reflections. Noticing that the illumination issue can be better mitigated by utilizing the full-wavefield data, i.e., including not only the primary reflections in the seismic data d, but also the transmission waves and their multiples, various groups at CGG (the assignee of this application) proposed FWI Imaging to realize full-wavefield imaging through least-squares fitting of the full-wavefield data as discussed in [6] and [7].

It has been demonstrated that FWI could be extended to produce FWI velocity and FWI Image in one inversion. FWI Images show not only comparable structures to those of conventional migration images, but also appealing benefits such as better amplitude balance, event continuity, and higher resolution, especially in the areas of poor illumination, marking another step change in subsalt imaging (see [6] and [7]).

However, the above discussed FWI methods are "acoustic FWI" approaches, i.e., a basic assumption in deriving the earth model m is that the medium (earth) is described by an acoustic approximation, i.e., by density $\rho(r)$ and the bulk modulus $K(r)$, where the vector r represents the position of a point in the subsurface relative to a chosen reference system. Despite the widespread success of acoustic FWI, the missing elasticity part of the model may result in non-negligible effects in the current FWI results. For example, elastic effects from the large impedance contrasts can smear the salt boundary and result in a salt halo considerably larger than what one skilled in the art would expect from the resolution limit at the inversion frequency. Although the salt halo, appearing as a smoothing effect of the salt boundary, inflicts little adverse impact on the overall model kinematics and thus the migration image focusing, it does pose a problem for direct interpretation of the FWI velocity and FWI Image around salt bodies. Additionally, the salt halo may have a more pronounced effect on the model kinematics in areas of small salt bodies or close to steep salt flanks.

The authors in [8] used synthetic examples to show that, even in marine settings, accounting for elastic effects is important. The authors in [9] proposed using filters derived from matching elastic modeled data to acoustic modeled data to compensate for the elastic effects in the acoustic FWI. However, accurately compensating for elastic effects in shot gathers is a very challenging task, especially in complex geological settings. The authors in [10] implemented an elastic waveform inversion to illustrate its potential benefits for salt model updates using long-offset, low-frequency seismic data. However, the improvements to the velocity models and migration images from the elastic FWI appear to be smaller than expected, making it difficult to justify the significantly increased cost.

Thus, there is a need for a new model that is capable to mitigate the salt halo and its subsequent effects on FWI velocity model, FWI image and migration kinematics.

SUMMARY OF THE INVENTION

According to an embodiment, there is a method for seismic imaging of a subsurface using a full waveform inversion, FWI, the method including obtaining an initial P-velocity model that describes how a seismic wave propagates through the subsurface, generating an S-velocity model based on the initial P-velocity model, generating an elastic synthetic dataset p based on the initial P-velocity model and the S-velocity model, receiving a recorded seismic dataset d of the subsurface, updating the P-velocity model based on a comparison between the synthetic dataset p and the recorded seismic dataset d, updating a reflectivity at various locations in the subsurface based on the updated P-velocity model, and generating an image of the subsurface based on the reflectivity.

According to still another embodiment, there is a computing device for seismic imaging of a subsurface using a full waveform inversion, FWI, and the computing device includes an interface configured to receive an initial P-velocity model that describes how a seismic wave propagates through the subsurface, and a processor connected to the interface and configured to, generate an S-velocity model based on the initial P-velocity model, generate an elastic synthetic dataset p based on the initial P-velocity model and the S-velocity model, receive a recorded seismic dataset d of the subsurface, update the P-velocity model based on a comparison between the elastic synthetic dataset p and the recorded seismic dataset d, update a reflectivity at various locations in the subsurface based on the updated P-velocity model, and generate an image of the subsurface based on the reflectivity.

According to yet another embodiment, there is a non-transitory computer readable medium including computer executable instructions, wherein the instructions, when executed by a processor, implement the method noted above.

BRIEF DESCRIPTION OF THE DRAWINGS

For a more complete understanding of the present invention, reference is now made to the following descriptions taken in conjunction with the accompanying drawings, in which:

FIGS. 1C and 1D show the analytic amplitude and phase from acoustic and elastic propagations, respectively;

DETAILED DESCRIPTION OF THE INVENTION

Figure 1A:
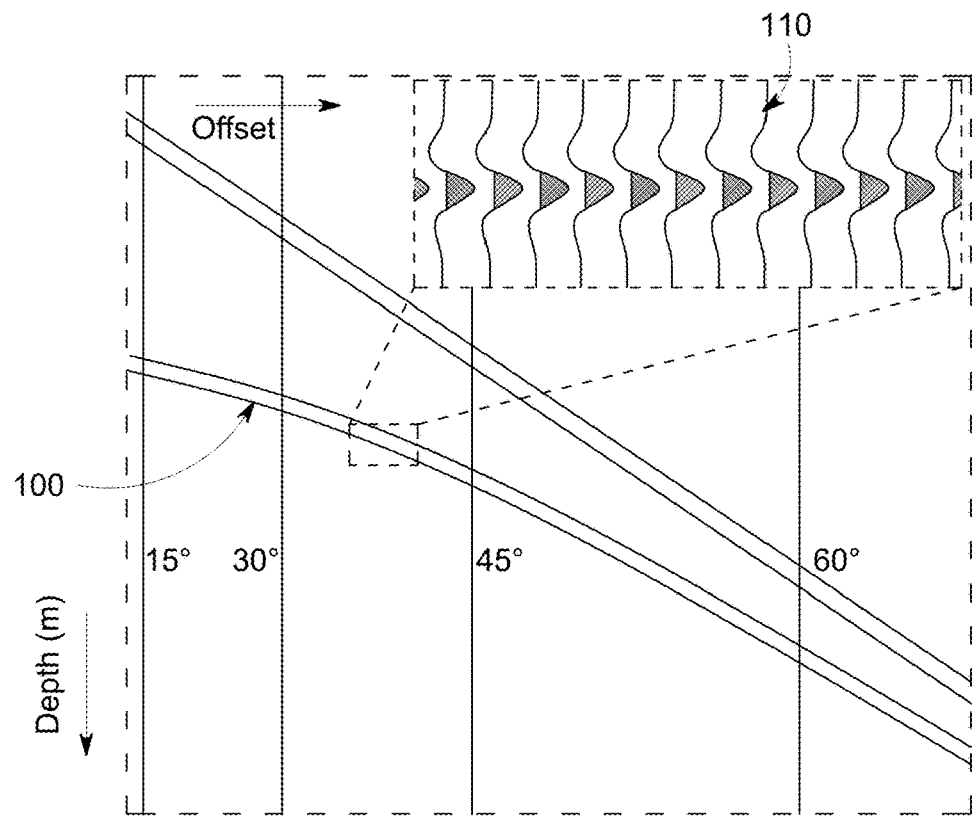
FIGS. 1A to 1D illustrate a synthetic comparison of a two-layer model, with synthetic traces from an acoustic engine shown in FIG. 1A and from an elastic engine shown in FIG. 1B.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to seismic data collected during a land seismic survey. However, the embodiments to be discussed next are not limited to such data, but may be applied to seismic data collected during a marine seismic survey, or even to other wave data processing, for example, electro-magnetic wave data, acoustic data, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

According to an embodiment, a novel FWI and Imaging method is discussed and this FWI and Imaging method is called herein elastic FWI and Imaging as the elastic character of the medium is taken into account. The elastic FWI and Imaging method is built on top of the A-TLFWI method, which was introduced by [3] and [4] discussed above. For this reason, the novel method is called herein Elastic Time-Lag Full Waveform Inversion E-TLFWI and Imaging. Details of this method are now discussed in the embodiments below.

The E-TLFWI method relies on an elastic modeling engine, i.e., a mathematical framework that takes into account not only the density $\rho(r)$ and the bulk modulus $K(r)$ of the subsurface, but also its stress and strain properties. In other words, the elastic modeling engine takes into consideration that a wave that propagates into the subsurface may propagate as a transversal wave, as a horizontal wave, or may have both of these components. Note that the terms "transversal" and "longitudinal" refer to the oscillation direction of a point on the wave relative to the propagation direction of the wave. For the acoustic modeling engine, that is currently being used for the traditional FWI processing, only the longitudinal waves are considered.

With the elastic modeling engine, which is discussed next, the modeled reflection and transmission energies at large impedance contrasts (i.e., between various layers in the subsurface) have amplitudes and phases that better match the recorded data d, which effectively reduces data misfits and improves the convergence. As a result, the salt halo is significantly reduced in the E-TLFWI velocity model and the resulting FWI Image has more balanced amplitudes, better continuity, and higher S/N when compared to its acoustic counterpart.

The three largest challenges to the success of the FWI method are cycle-skipping, amplitude discrepancy between synthetic and recorded data, and insufficient physics in the modeling engine. In this embodiment, an elastic modeling engine is combined with a time-lag cost function to tackle all these challenges. More specifically, a stress vector σ, which describes the elasticity of the subsurface, and is part of the elastic modeling engine, is defined as:

$$\sigma = (\sigma_{11}, \sigma_{22}, \sigma_{33}, \sigma_{23}, \sigma_{13}, \sigma_{12})^T \tag{1}$$

and a strain vector E, which also describes the elasticity of the subsurface, and is also part of the elastic modeling engine, is defined as:

$$\epsilon = (\epsilon_{11}, \epsilon_{22}, \epsilon_{33}, \epsilon_{23}, \epsilon_{13}, \epsilon_{12})^T \tag{2}$$

Hooke's law for a linear elastic material can be written, in terms of the stress vector σ and the strain vector E, as:

$$\sigma = C\epsilon, \tag{3}$$

where C is a stiffness matrix (or tensor) of the material parameters. In the case of orthorhombic media, the matrix C can be expressed as:

$$C = \begin{pmatrix} c_{11} & c_{12} & c_{13} & 0 & 0 & 0 \\ c_{21} & c_{22} & c_{23} & 0 & 0 & 0 \\ c_{31} & c_{32} & c_{33} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{66} \end{pmatrix}. \tag{4}$$

Relying on Tsvankin formalism (see Tsvankin, I., 1997, Anisotropic parameters and P-wave velocity for orthorhombic media: GEOPHYSICS, 62(4), 1292-1309), the following model parametrization system is introduced:

$$c_{11} = \rho(1 + 2\varepsilon_2)v_p^2, \tag{5}$$

$$c_{22} = \rho(1 + 2\varepsilon_1)v_p^2,$$

$$c_{33} = \rho v_p^2,$$

$$c_{44} = \rho \frac{1 + 2\gamma_1}{1 + 2\gamma_2} v_s^2,$$

$$c_{55} = \rho v_s^2,$$

$$c_{66} = \rho(1 + 2\gamma_1)v_s^2,$$

where $v_p$ and $v_s$ are vertical P-wave and S-wave velocities, respectively, and $$c_{12} = \sqrt{c_{11} - c_{66}}\sqrt{(1 + 2\gamma_3)c_{11}} - c_{66} - c_{66},$$

$$c_{13} = \sqrt{c_{33} - c_{55}}\sqrt{(1 + 2\gamma_2)c_{11}} - c_{66} - c_{66},$$

$$c_{23} = c_{33} - c_{44}(1 + 2\gamma_1)c_{33} - c_{44} - c_{44}. \tag{6}$$

The dimensionless coefficients ε and γ are defined as follow (see Tsvankin):

$$\varepsilon_1 = \frac{c_{22} - c_{33}}{2c_{33}}, \tag{7}$$

$$\varepsilon_2 = \frac{c_{11} - c_{33}}{2c_{33}},$$

$$\gamma_1 = \frac{c_{66} - c_{55}}{2c_{55}},$$

$$\gamma_2 = \frac{c_{66} - c_{44}}{2c_{44}},$$

$$\gamma_3 = \frac{(c_{12} + c_{66})^2 - (c_{11} - c_{66})^2}{2c_{11}(c_{11} - c_{66})},$$

Next, a derivative matrix D is defined as:

$$D = \begin{pmatrix} \partial_1 & 0 & 0 & 0 & \partial_3 & \partial_2 \\ 0 & \partial_2 & 0 & \partial_3 & 0 & \partial_1 \\ 0 & 0 & \partial_3 & \partial_2 & \partial_1 & 0 \end{pmatrix}. \tag{8}$$

The elastic wave equation that describes the elastic properties of the subsurface can now be written as:

$$\rho \partial_{tt}^2 u = D^T \sigma, \tag{9}$$

where $u = (u_1, u_2, u_3)^T$ is the displacement vector of a particle of the subsurface when interacting with a propagating wave. Based on the small strain assumption, the strain E and the displaced vector u have the following linear relationship:

$$\epsilon = Du. \tag{10}$$

Combining equations (3), (9), and (10), the following second order equation for stress is obtained:

$$\partial_{tt}^2 \sigma = CD\left(\frac{1}{\rho} D^T \sigma\right). \tag{11}$$

After deriving the stress vector σ from equation (11), it is possible to compute the synthetic pressure data p as follows:

$$p = \frac{(\sigma_{11} + \sigma_{22} + \sigma_{33})}{3}. \tag{12}$$

In other words, the synthetic dataset p is equal to an average of the first three diagonal terms of the stress vector α for the subsurface.

The pressure data p, being calculated based on the stress present in the subsurface, takes into account the elastic properties of the earth, which the traditional FWI engines do not. As the acoustic TLFWI method previously discussed is effective in mitigating cycle-skipping and amplitude-discrepancy issues, a time-lag cost function from the acoustic TLFWI formalism is combined with the pressure data of equation (12) as follows:

$$J(d,p) = \Sigma_{s,r,w} c \Delta \tau^2, \tag{13}$$

where the term $\Sigma_{s,r,w} c \Delta \tau^2$ is the adjoint source of the cost function, c is a cross-correlation coefficient, w is a window index, s is an index for the source, r is an index for the receiver or sensor, and Δτ is the traveltime difference between the measured data d and the synthetic (calculated) data p, and it may be obtained by maximizing the cross-correlation of the synthetic data p and the recorded data d in a time window between $t_1$ and $t_2$, as discussed in [11], the entire disclosure of which is included herein by reference, i.e., $$\Delta\tau = \underset{\tau}{\operatorname{argmax}} \int_{t_1}^{t_2} d(t+\tau)p(t)dt. \tag{14}$$

While equation (13) suggests that the measured data d needs to be pressure data, one skilled in the art would know that particle movement data (which is typically recorded with accelerometers in the seismic context) can be converted to pressure data and then used with the E-TLFWI formalism developed above.

Equation (13) is the basis for the novel E-TLFWI approach as it includes not only the acoustic properties but also the elastic properties of the analyzed subsurface. The E-TLFWI can theoretically invert for both $v_p$ and $v_s$. However, in practice, to avoid the crosstalk of multi-parameter inversion, the inverting variable is often only $v_p$, with the $v_s$ set fix or updated with $v_p$ based on a pre-defined relationship. Like the case of A-TLFWI, the E-TLFWI approach can also be extended to produce an elastic FWI Image, for example, being the normal derivative of the P-wave impedance I, assuming a smoothly varying density model as discussed in [6].

More specifically, the reflectivity is defined as the volumetric distribution of the reflection coefficients at various locations in the subsurface. At normal incidence, the reflection coefficient is the normalized impedance contrast, and the impedance contrast across the interface can be obtained by:

$$\frac{\partial I}{\partial n} = \frac{\partial I}{\partial x}\sin\theta\cos\varphi + \frac{\partial I}{\partial y}\sin\theta\sin\varphi + \frac{\partial I}{\partial z}\cos\theta, \tag{15}$$

where the impedance I is the multiplication of density and velocity, $I=\rho v$, and $\theta$ and $\varphi$ are dip angle and azimuth angle of the normal vector to the subsurface reflectors, which can be obtained by automatically scanning through the velocity model. In this embodiment, it is assumed that the density is a constant or a smooth function.

Then the impedance contrast can be approximated as:

$$\frac{\partial I}{\partial n} \approx \rho\left(\frac{\partial v_p}{\partial x}\sin\theta\cos\varphi + \frac{\partial v_p}{\partial y}\sin\theta\sin\varphi + \frac{\partial v_p}{\partial z}\cos\theta\right). \tag{16}$$

The values of equation (16) can then be plotted to generate an image of the subsurface, which is typically used by the oil and gas operators for predicting the location of an oil and gas reservoir (or other resources), and for determining the best location for drilling a well for accessing those resources. Note that the sudden changes in the reflectivity from one layer to another layer are visible on the calculated images, as now discussed.

Figure 1B:
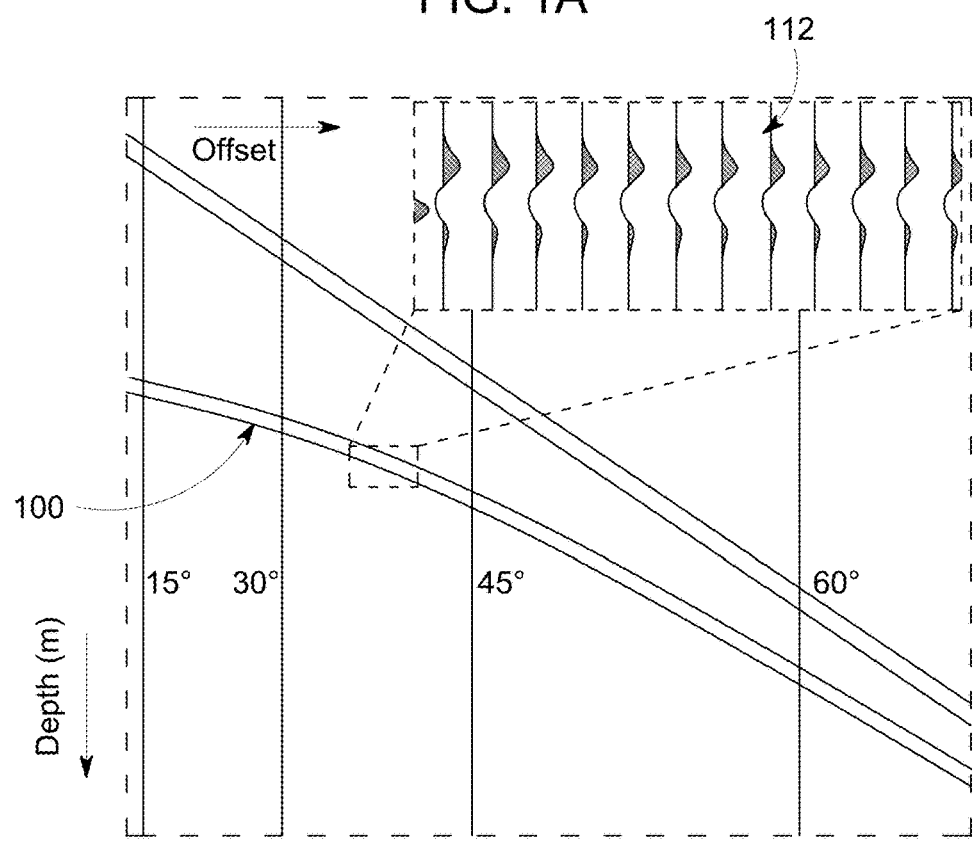
Figure 1C:
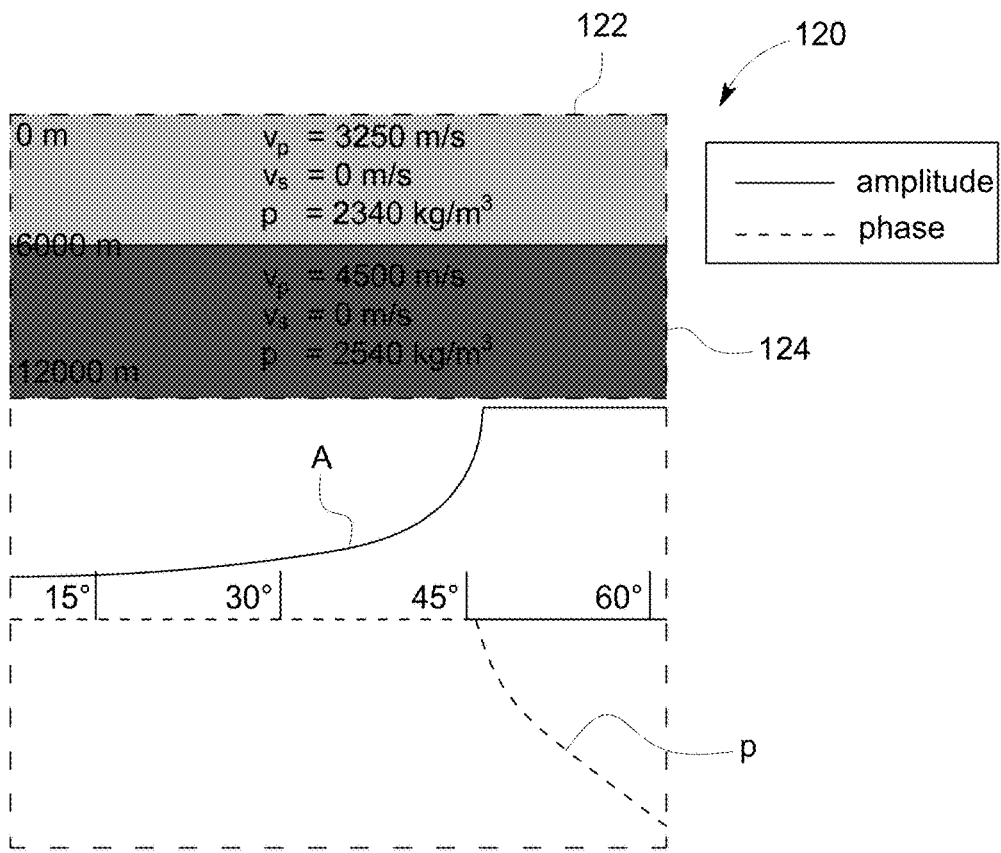
Figure 1D:
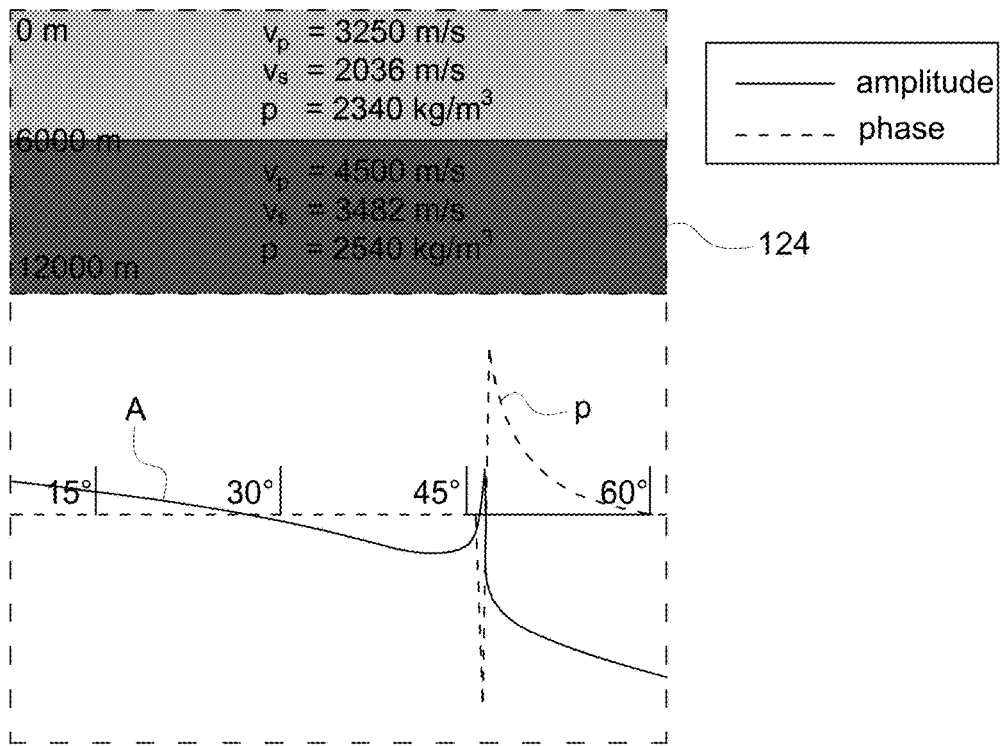

The inventors first compared synthetic data modeled by acoustic and elastic modeling engines in the presence of large impedance contrasts to illustrate why an elastic modeling engine is necessary in such cases. Then, the inventors demonstrated the effectiveness of E-TLFWI using an OBN dataset in the Gulf of Mexico (GoM). First, the difference between the acoustic A-TLFWI approach and the elastic E-TLFWI approach was investigated, at a large impedance contrast with a two-layer synthetic test. FIGS. 1A and 1B show a synthetic shot gather 100 modeled by an acoustic and an elastic engine, respectively. The wiggle displays 110 and 112 of the corresponding zoomed-in sections show the phase difference between the acoustic and elastic engines. The difference in this simple example can be validated by the analytical solutions, which are illustrated in FIGS. 1C and 1D for the acoustic and elastic engines, respectively. The earth model 120 includes only two layers 122 and 124, and the characteristics (density and P-wave and S-wave velocities) of each layer are illustrated in the figures. The amplitudes A and phases $\varphi$ in the two approaches differ substantially from each other as shown in FIGS. 1C and 1D. These differences create a systematic data mismatch for the strong reflection energy from large impedance contrasts in the acoustic FWI using field data, which in turn gives artificial velocity updates around the sharp boundary. The inventors believe that this is the main reason A-TLFWI often suffers from salt halos for field data examples in salt settings.

Figure 2A:
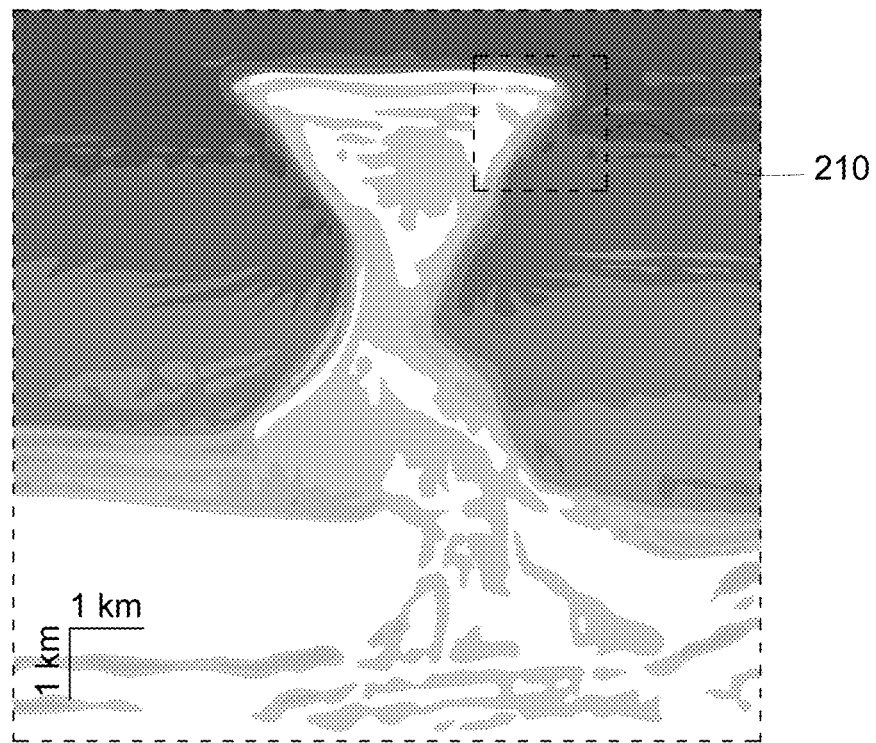
FIG. 2A illustrates a section view of the 15 Hz Acoustic Time-Lag FWI (A-TLFWI) velocity model.
Figure 2B:
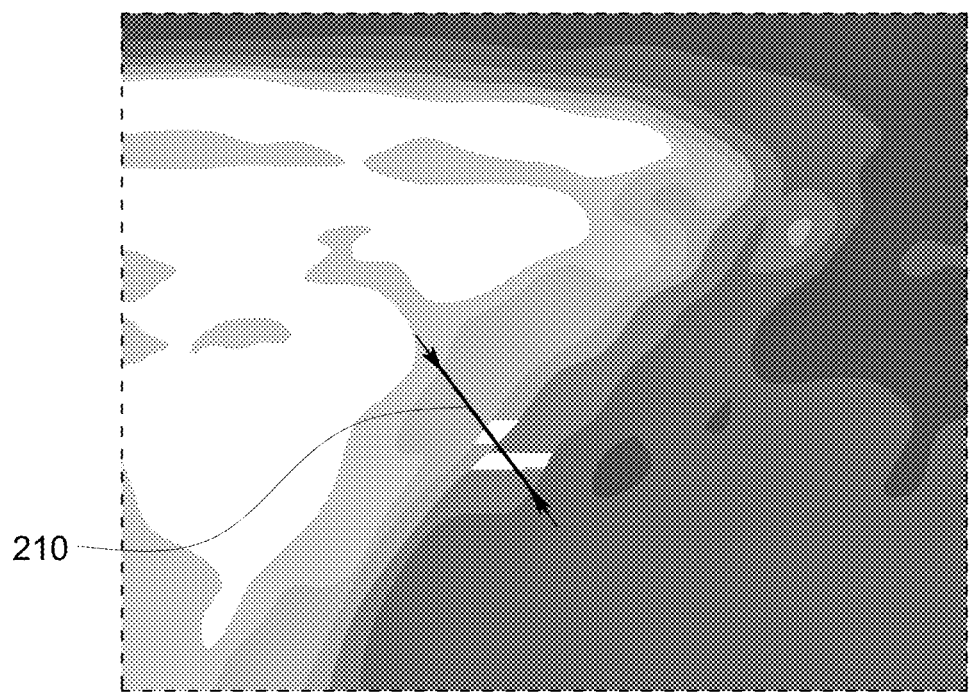
FIG. 2B is a zoomed-in portion of a halo salt boundary.
Figure 2C:
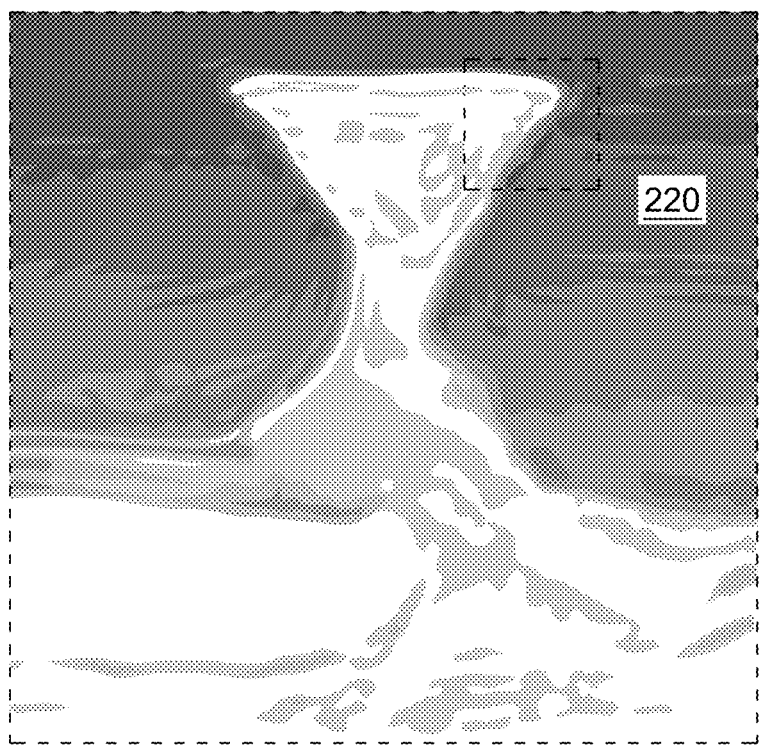
FIG. 2C illustrates the 15 Hz Elastic Time-Lag FWI (E-TLFWI) velocity model.
Figure 2D:
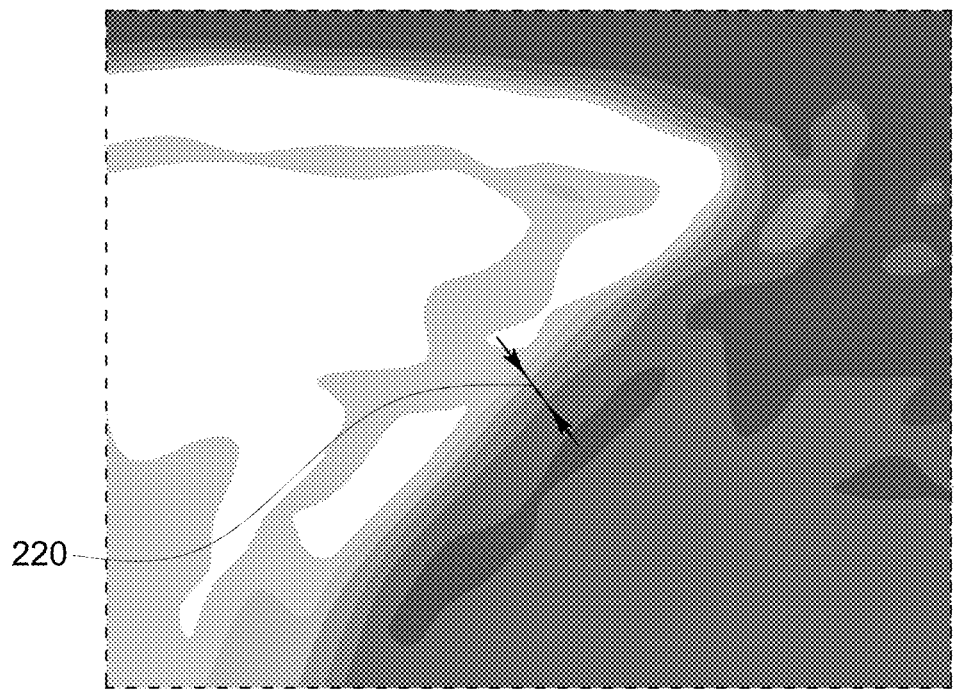
FIG. 2D is the zoomed-in of a sharpened salt boundary and improved velocity details in sediments.

When actual data recorded in the field is considered, the A-TLFWI approach with the ocean bottom node (OBN) dataset has shown significant improvements in the velocity model and reverse time migration (RTM) image quality over the conventional top-down velocity model building workflow. Note that the conventional RTM image takes the processed primary reflections as input, and the modeling does not simulate surface-related multiples. In contrast, FWI Imaging uses raw data with all the recorded signals, including transmissions, refractions, and both primary and multiple reflections. The extra input in the FWI Imaging offers additional illumination that infills the illumination holes and extends the coverage at the survey boundary. The salt halo 210 of the 15 Hz A-TLFWI velocity model is still apparent as shown in FIGS. 2A and 2B. However, when the E-TLFWI approach is used for the same frequency of 15 Hz, as shown in FIGS. 2C and 2D, the salt halo 220 of the E-TLFWI model is considerably reduced compared with that in the A-TLFWI velocity model, which indicates that the elastic effects have a significant impact on the sharpness of the inverted salt boundaries in addition to the inversion frequency. The sharpened salt boundaries around the steeply dipping salt flank in the E-TLFWI model can be better observed in the zoomed-in displays in FIGS. 2B and 2D. Besides sharper salt boundaries, the E-TLFWI model also shows clearer velocity contrasts and better details in the sediment and subsalt areas than the A-TLFWI model.

Figure 3A:
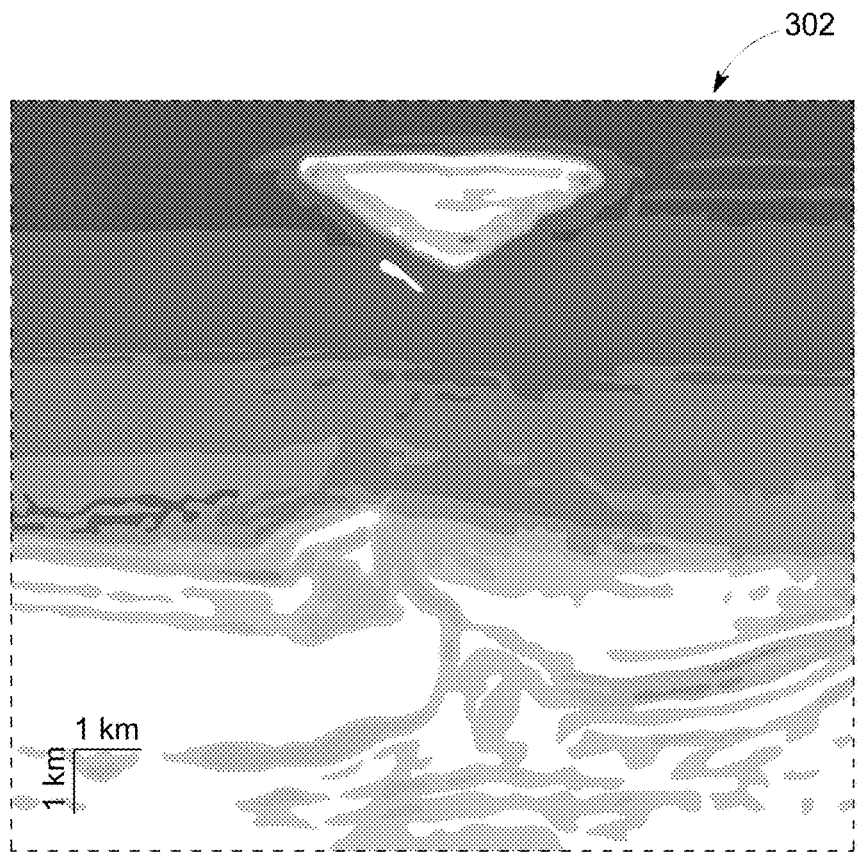
FIG. 3A is a section view of the 15 Hz A-TLFWI velocity model.
Figure 3B:
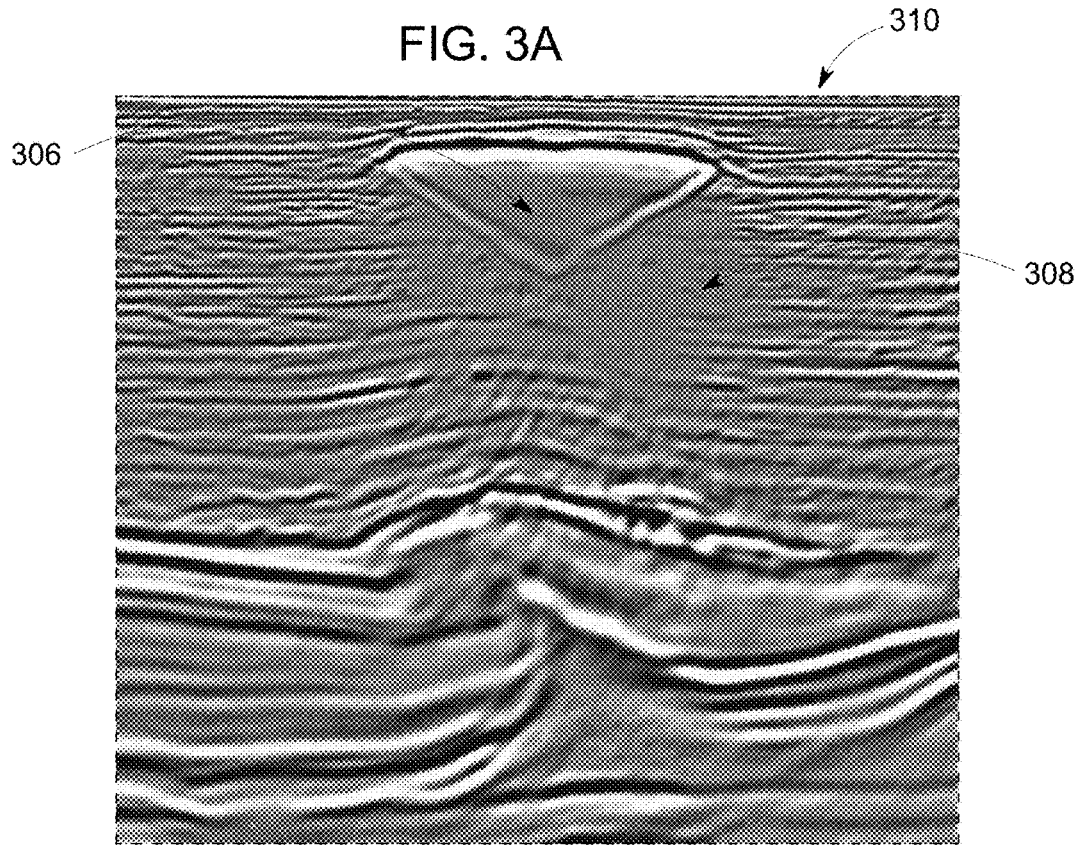
FIG. 3B is a section view of the 15 Hz acoustic RTM image migrated with the A-TLFWI model.
Figure 3C:
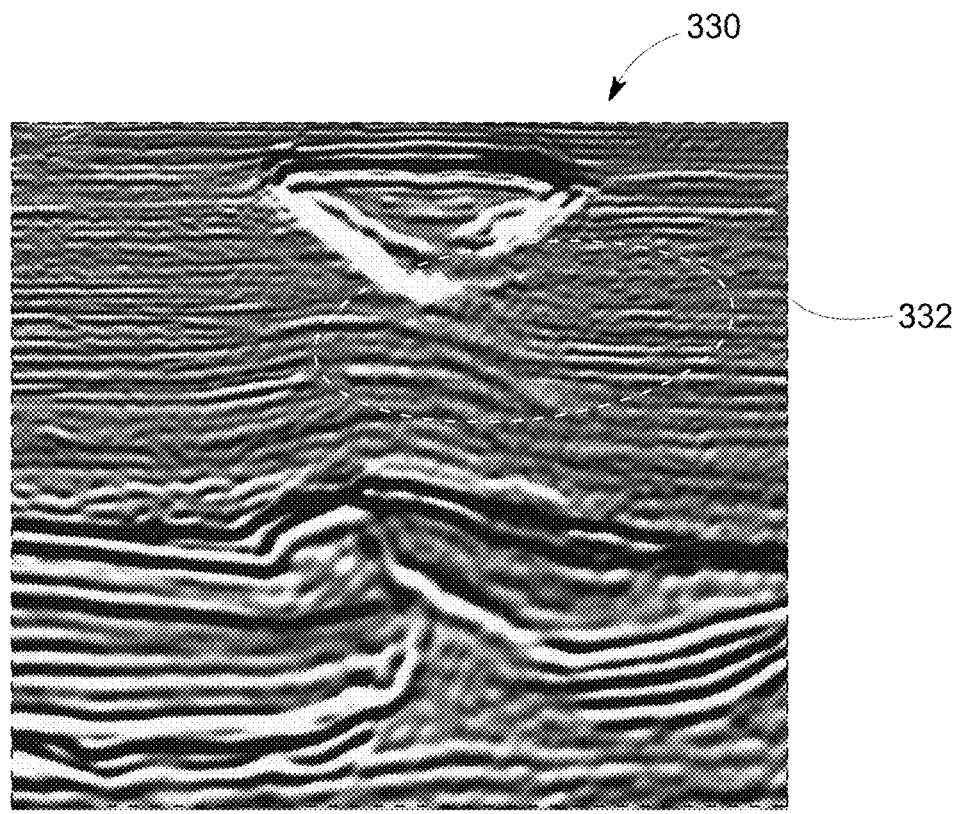
FIG. 3C is a section view of the 15 Hz FWI Image from the A-TLFWI model.
Figure 3D:
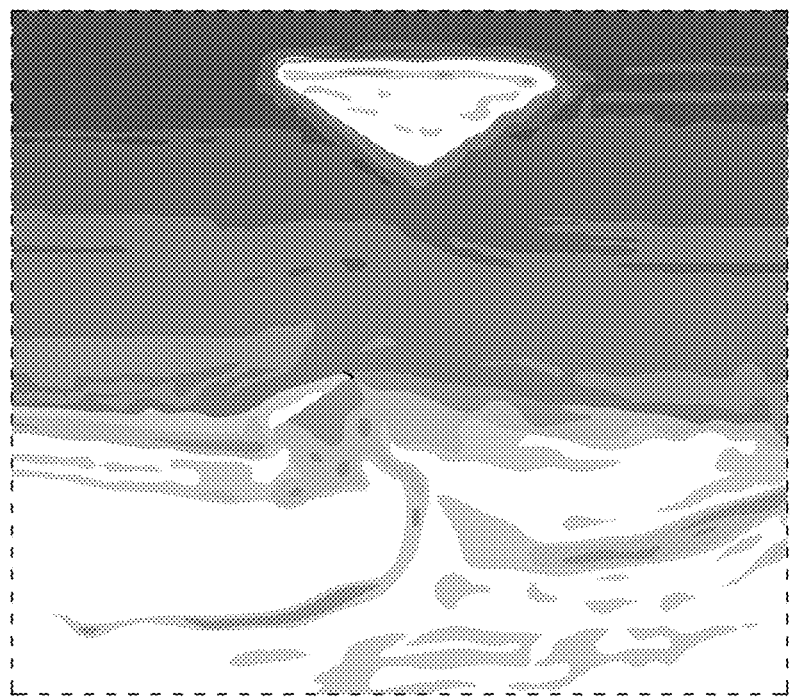
FIG. 3D is a section view of the 15 Hz E-TLFWI velocity model.
Figure 3E:
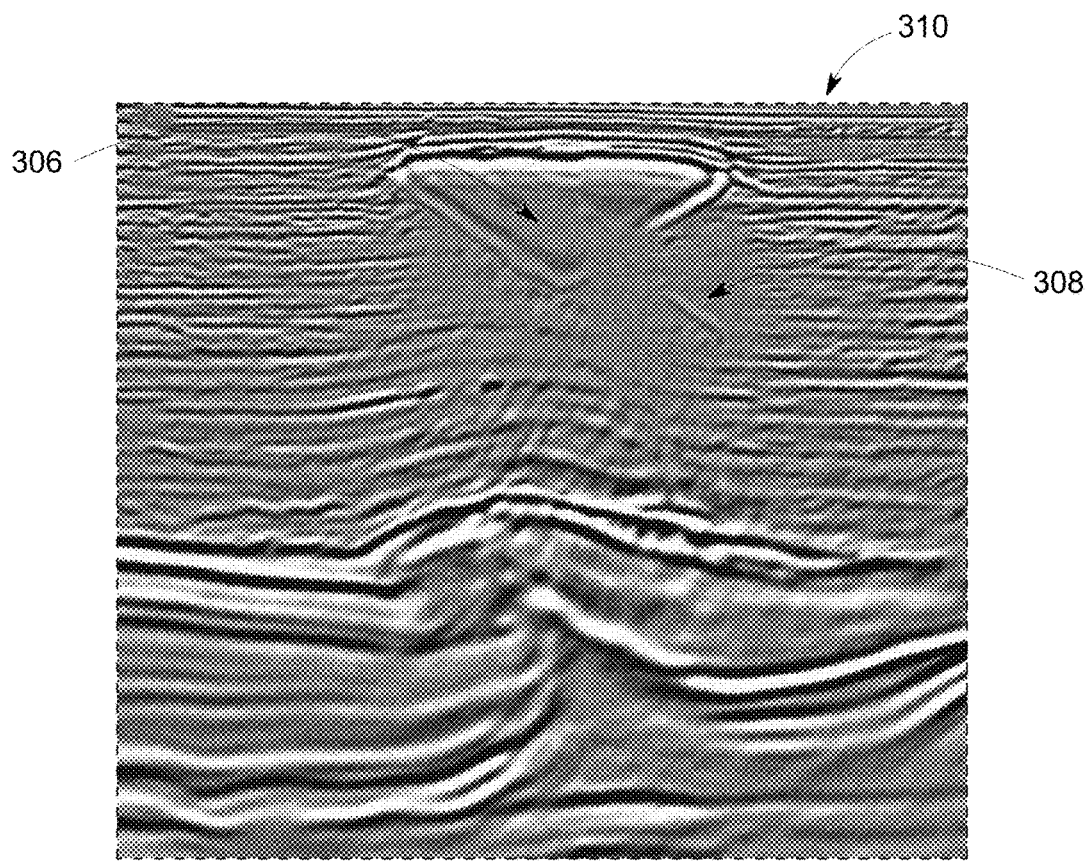
FIG. 3E is a section view of a 15 Hz acoustic RTM image migrated with the E-TLFWI model.

Despite the improved velocity model with E-TLFWI (FIG. 3A shows the velocity model 302 with the A-TLFWI approach and FIG. 3D shows the velocity model 304 obtained with the E-TLFWI approach), the acoustic RTM images 310 and 320 with the acoustic and elastic TLFWI velocity models 302 and 304, respectively, exhibit similar quality, as illustrated in FIGS. 3B and 3E. The only slight improvements in the RTM images are observed in the area right below the steep salt flank 306, where the reduced salt halo in the E-TLFWI model has a more appreciable effect on the kinematics.

However, there is a dim amplitude zone 308 with low S/N, likely due to poor illumination in this local area. Meanwhile, the acoustic FWI Image 330, shown in FIG. 3C, shows balanced amplitude and improved event continuity compared to both RTM images 310 and 320. However, the events in the acoustic FWI Image 330 right below base of Salt (BOS) still have cross-cutting noises 332 parallel to the BOS likely due to the local velocity errors from salt halo. Additionally, the subsalt events right below the BOS are not clearly imaged (see zone 332) since they are masked by the salt halo. In contrast, the elastic FWI Image 340 better reveals the reflectors 342 around and below the salt 306, with more balanced amplitudes and improved continuity (see FIG. 3F).

The E-TLFWI velocity model from the OBN data shows notably reduced salt halos compared with its acoustic counterpart (FIGS. 2B and 2D). Still, the uplifts from RTM using the A-TLFWI velocity compared to that using the E-TLFWI velocity are far less impressive (FIGS. 3B and 3E). This is not very surprising since the RTM approach, as a migration approach, is largely determined by the kinematic information contained in the low wavenumbers of the velocity model. Even though high-wavenumber details are present in the velocity, such as the sharpness of salt boundaries, it can introduce small kinematic errors. Their effects on subsalt images are barely observed in the RTM images 310 and 320 because the RTM approach is susceptible to bigger problems coming from poor illumination and residual noise in the data. In other words, for the RTM approach and other migration-based approaches, even if the propagation engine is upgraded from acoustic to elastic, may still not be good enough to appreciate the full benefits of high-wavenumber details in the elastic FWI velocity models.

Figure 3F:
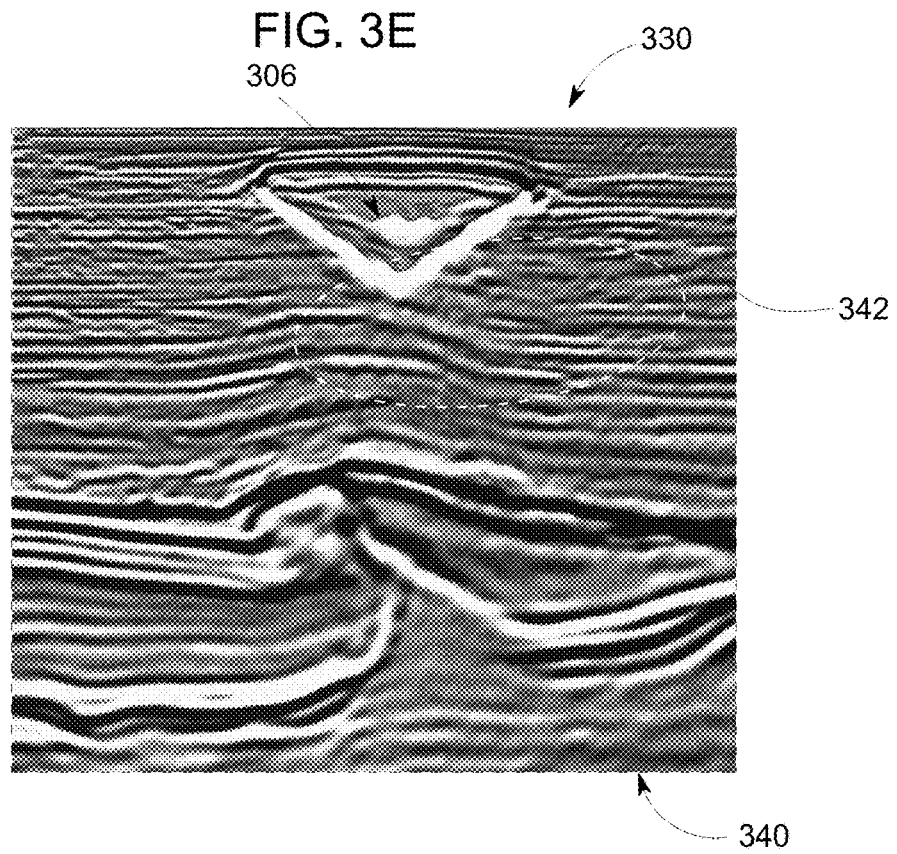
FIG. 3F is a section view of the 15 Hz FWI Image from the E-TLFWI model.

FWI Imaging (see [6] and [7]), which utilizes the full-wavefield data, applies least-squares data fitting from low to high frequencies, and derives a velocity and an image in one consistent inversion. The FWI Imaging has been shown to provide much more improved structural images than RTM. It can be seen that the acoustic FWI Image 330 in FIG. 3C is considerably better than the RTM image 310 in FIG. 3B using the same acoustic FWI velocity model and that the elastic FWI Image 340 in FIG. 3F is considerably better than the RTM image 320 in FIG. 3E using the same elastic FWI velocity model. Compared to the A-TLFWI Image 330, the more balanced amplitude, improved event continuity, and higher S/N from the E-TLFWI Image 340 should significantly reduce the uncertainty in reservoir interpretation.

In addition, with this more advanced imaging approach, those in the art of seismic analysis can now witness the long-expected imaging benefits from elastic FWI that are worth the considerably increased compute cost over the acoustic FWI. In this regard, the synthetic example discussed with regard to FIGS. 1A to 1D showed that an elastic modeling engine is advantageous for FWI to reduce the discrepancy between synthetic data and real data in the presence of large impedance contrasts. The real OBN data example demonstrated that the novel E-TLFWI approach can significantly reduces the salt halo, which is typically observed in the A-TLFWI approach. In the case of the OBN data, it was showed that the FWI Imaging is a more advanced imaging technology when using the E-TLFWI approach over the standard migration approaches. FWI Images from E-TLFWI have more balanced amplitude, improved event continuity, and higher S/N than their acoustic counterparts.

Figure 4:
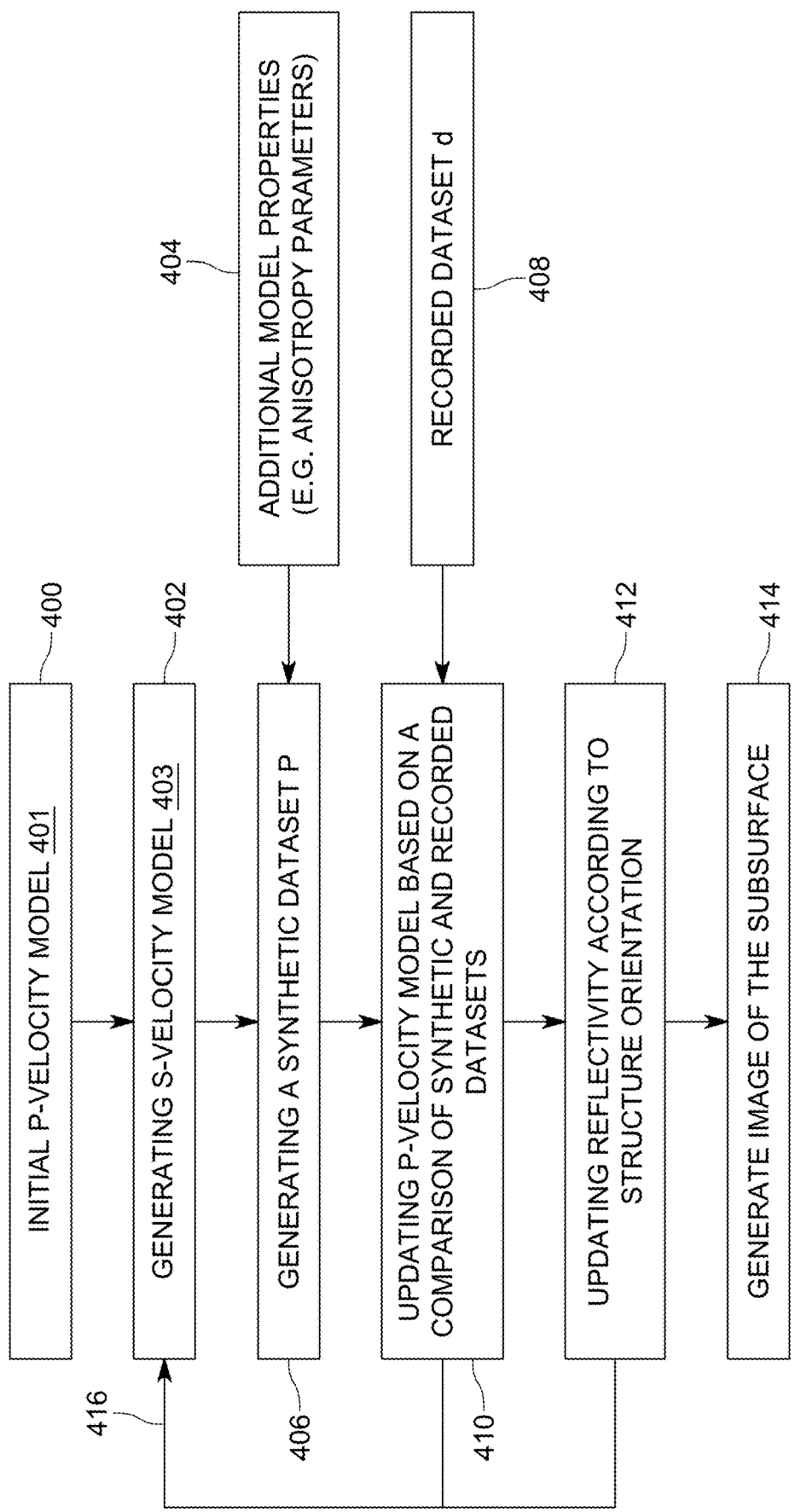
FIG. 4 is a flow chart of a method for updating an earth model according to an embodiment.

A method for applying the E-TLFWI approach to actual seismic data for generating an image of the subsurface so that an oil and gas specialist can decide where to drill a well is now discussed with reference to FIG. 4. The method includes a step 400 of receiving (or generating) an initial P-velocity model 401, which describes the propagation speeds of the seismic waves in the various layers of the substrate that is being investigated. This earth model, i.e., the velocity model for P-wave, could have been calculated using travel time tomography on the seismic data, from previous implementations of FWI on the seismic data or using well log information.

In step 402, an S-velocity model 403 is generated from the P-velocity model 401 using empirical relations between P and S velocity properties. One or more additional model properties (e.g., anisotropy parameters) may be provided in step 404. In one application, other parameters may be added, which are related to tilted transverse isotropy (TTI), vertical transverse isotropy (VTI), horizontal transverse isotropy (HTI), orthorhombic anisotropy, attenuation, or any other earth property. This step is optional. In step 406, a synthetic dataset p is generated based on equation (13) discussed above and also based on the velocity models 401 and 403. One method of generating the synthetic dataset is by propagating a source signature through the earth model. The synthetic dataset p is a pressure data in this embodiment. However, one skilled in the art would understand that the pressure data may be changed or transformed to particle motion data or other type of data.

In step 408, the seismic data d is received, for example, from an area over the underground structure of interest. This data, also called observed data or recorded data, could be from a new seismic survey or could be from an earlier seismic survey that is to be studied anew. In step 410, an update of the initial P-velocity earth model 401 is performed based on a comparison between the synthetic data p and the recorded data d, for example, using the cost function of equation (13). In step 412, the reflectivity is updated, based on equation (16), and according to the structure orientation, i.e., the parameters received in step 404. In one application, the reflectivity update may be performed as in [11], in which case a demigration process has to be used to model the synthetic reflection data. One of the advantages of this approach is that it facilitates the separation between the high-wavenumber and low-wavenumber components of the FWI gradient. In step 414, the updated reflectivity is used to generate an image of the subsurface (see, for example, the image 340 in FIG. 3F). Then, in step 416, the S-Velocity model 403 is updated using the updated P-velocity and the reflectivity models. This updating step is performed by means of a FWI scheme which is an iterative scheme.

The FWI scheme might have additional constraints or regularization techniques added to the process step. These are generally designed to honor a priori information about the earth model but could also be designed to impose various beliefs or behaviors about the Earth model. These constraints could be chosen from among a non-exhaustive list as follows:

Imposing a mask, or no update, zone in the Earth model.
Incorporating information from well-logs.
Incorporating other a priori information, for example, from 4D differences or a tomographic Earth model update.
Imposing a bound, or box constraint, on the Earth model parameters.
Imposing an edge-preserving constraint.
Imposing a total-variation constraint.
Imposing a hinge-loss one sided constraint.
Imposing a cross-gradient constraint.
Imposing facies-based constraints.
Other constraints to promote a specific behavior or belief in the Earth model.
All possible combinations of the above.

Figure 5:
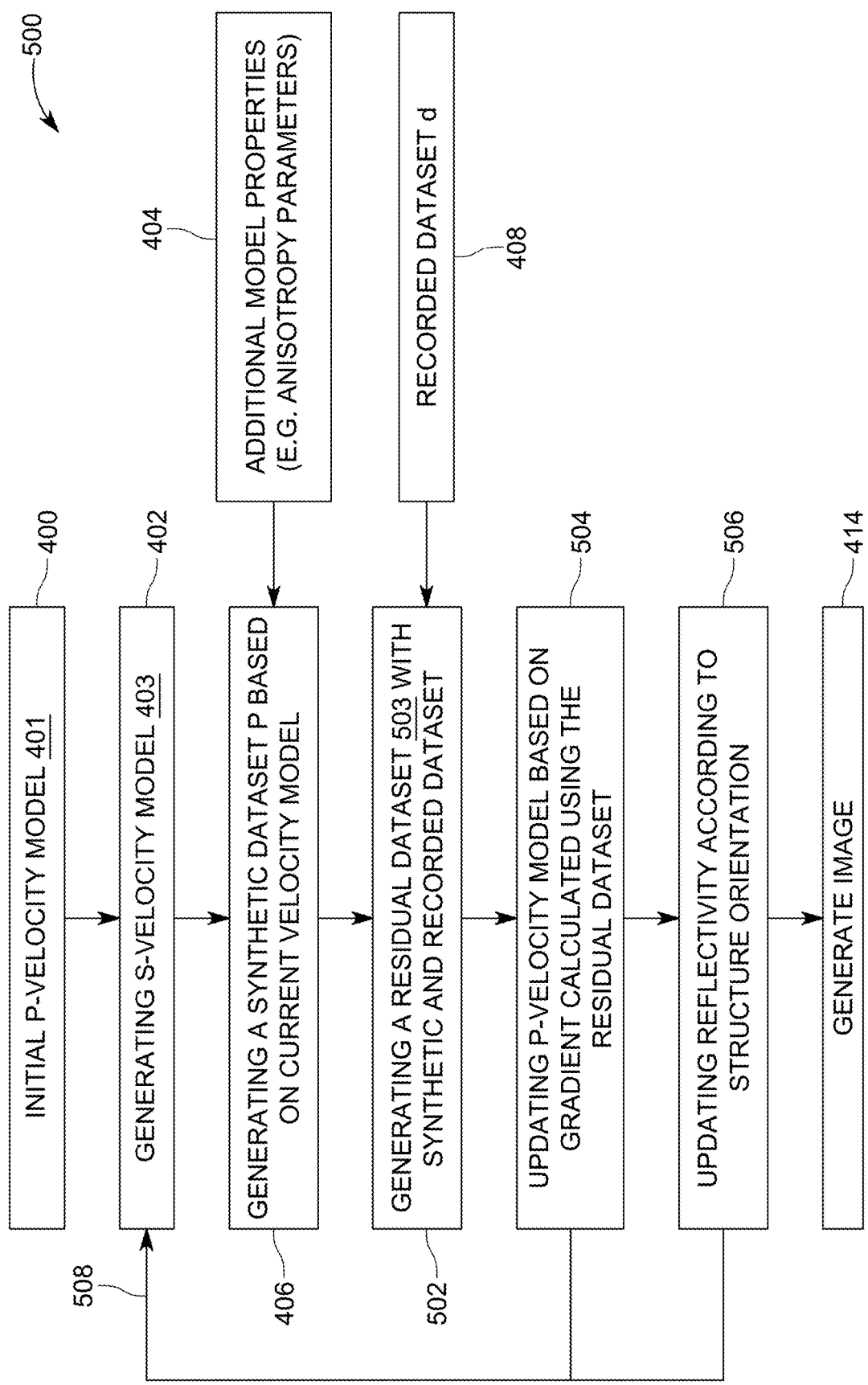
FIG. 5 is a flow chart of another method for updating an earth model according to a second embodiment.

The method discussed above may be modified to have additional steps, to provide more detail in the FWI imaging. Referring to FIG. 5, the method includes the steps 400 to 408 and 414 discussed above, and thus, their description is omitted herein. However, after the step 408 of providing the recorded data, a step 502 of generating a residual dataset 503 is performed, where the residual dataset 503 may be, in this embodiment, a difference between the recorded dataset d and the synthetic dataset p. The residual dataset 503 may also be calculated in different ways. Then, in step 504, the method performs an update of the initial P-velocity earth model 401 based on a gradient calculated using the residual dataset 503. The gradient can be calculated, for example, using the adjoint-state method as described in R. E. Plessix's 2006 article, "A review of the adjoint-state method for computing the gradient of a functional with geophysical applications," published in *Geophysical Journal International*, Volume 167, Issue 2, pp 495-503, which is incorporated herein by reference in its entirety. Then, in step 506, the reflectivity is updated according to the structure orientation, similar to step 412 in FIG. 4. The S-Velocity model 403 is updated in step 508 using the updated P-velocity and reflectivity model from steps 504 and 506. This updating step is performed by means of a FWI scheme which is an iterative scheme, similar to step 416 in FIG. 4.

Figure 6:
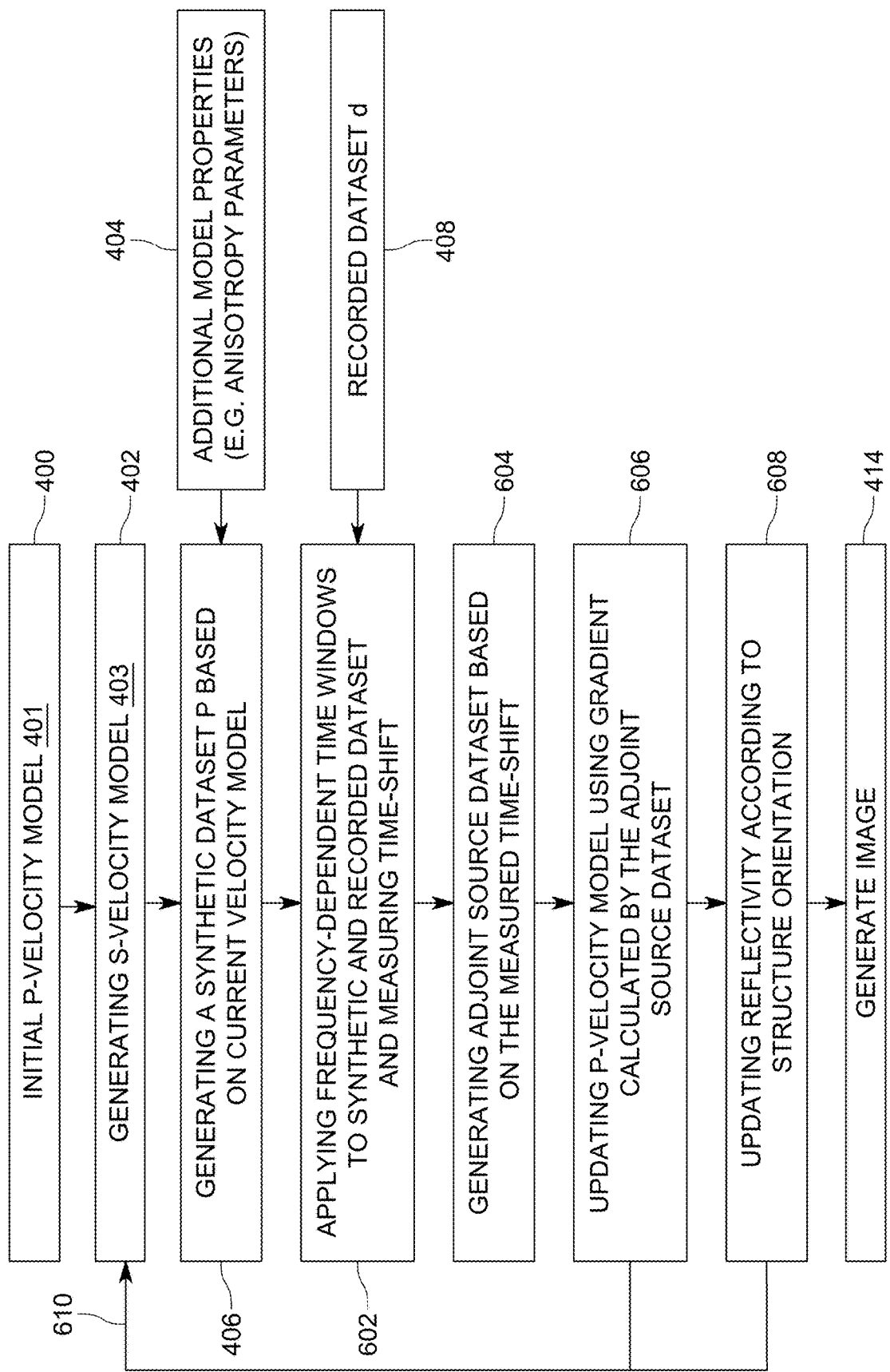
FIG. 6 is a flow chart of yet another method for updating an earth model according to a third embodiment.

The E-TLFWI may also be applied with other modifications to further increase the amount of detail in the FWI imaging as now discussed with regard to FIG. 6. Steps 400 to 408 and 414 are similar to those in the embodiment illustrated in FIG. 4, and thus, the description of these steps is not repeated herein. Following generation of the synthetic dataset p in step 406 and obtaining the recorded seismic data d in step 408, frequency-dependent time windows (as discussed in [11]) are applied in step 602 to the synthetic and recorded data prior for measuring a time shift. The time-shifts are determined so as to achieve maximum cross-correlation between time-shifted recorded seismic data d and synthetic data p in respective frequency-dependent time windows. A frequency-dependent time window selection technique turned out to be a good fit-for-purpose solution. This technique uses the formula $$L = \frac{k}{f},$$

where L is the window length in seconds (s), k is a user input parameter, usually between 2 and 5, and f is frequency in Hertz (Hz). At low frequencies (e.g., 1-4 Hz), where the wavelet lasts longer-than-average and the data is often noisier, a longer time window is desirable. At high frequencies (e.g., larger than 4 Hz), where the wavelet becomes shorter than at low frequencies and the data becomes less noisy (also, the velocity error is hopefully smaller as well due to a low-frequency FWI update), a shorter time window can be used to measure the time-shifts more precisely.

At step 604, an adjoint source dataset is generated based on the measured time-shift and equation (13). In step 606, the method updates the initial P-velocity earth model 401 based on a gradient calculated using the adjoint source dataset, similar to step 504 discussed above. In step 608, the reflectivity of the subsurface is updated according to the structure orientation, similar to step 412 previously discussed. Then the S-Velocity model 403 is updated in step 610 using updated P-velocity and reflectivity models from steps 606 and 608, respectively. This updating step is performed by means of a FWI scheme which is an iterative scheme.

Figure 7:
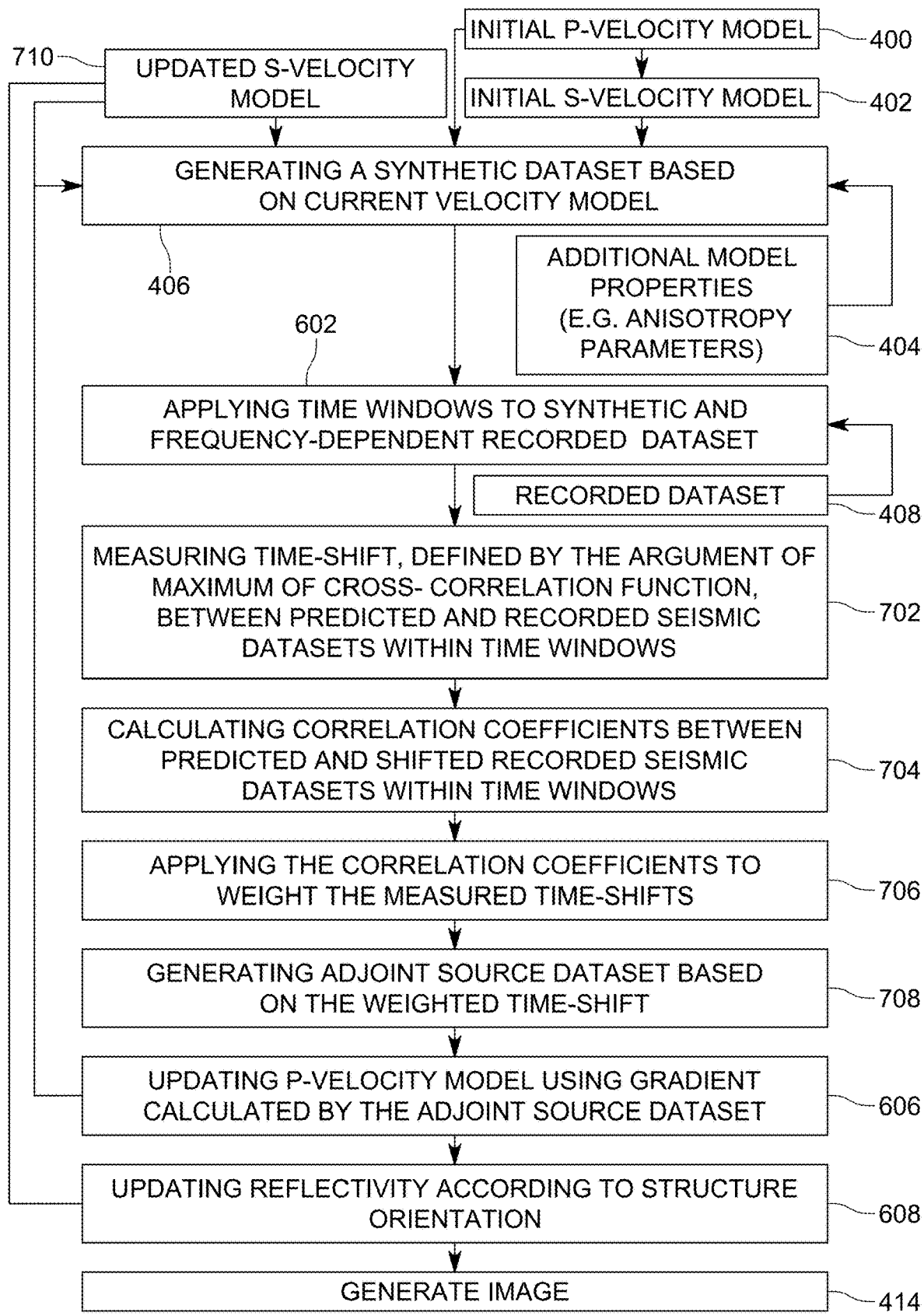
FIG. 7 is a flow chart of still another method for updating an earth model according to a fourth embodiment.

Another variation of the method illustrated in FIG. 4 may produce the highest level of detail in the FWI Imaging as now discussed with reference to FIG. 7. This modified method includes the steps 400 to 408 and 414, which are similar to the same steps in the method of FIG. 4, and thus, their description is omitted herein. Step 602 is similar to the same step in the method of FIG. 7, and thus its description is omitted herein. In step 702, a time-shift is measured, defined by the argument of a maximum of the cross-correlation function, between the synthetic p and recorded d seismic datasets within time windows as previously discussed with regard to step 602. Correlation coefficients between the synthetic or predicted dataset p and the shifted recorded seismic dataset (i.e., the recorded seismic dataset d is shifted by the travel-time calculated in steps 702) within the time windows is computed at step 704. Then, in step 706, the calculated correlation coefficients are applied to weight the measured time-shifts and in step 708, an adjoint source dataset is generated based on the weighted time-shift. This step follows the mathematical formalism discussed with regard to step 604.

Next, in step 606, an update of the initial P-velocity earth model is performed based on the gradient calculated using the adjoint source dataset from step 708 and in step 608, an update of the reflectivity is performed according to the structure orientation, following the same methodology used in step 608 of FIG. 6. Then, the S-Velocity model is updated in step 710, following an empirical relation using the updated P-velocity and with constraints guided by the updated reflectivity model. This updating step is performed by means of a FWI scheme which is an iterative scheme. Note that different from step 610 in FIG. 6, this step is not based on the initial S-velocity model obtained in step 402.

Figure 8:
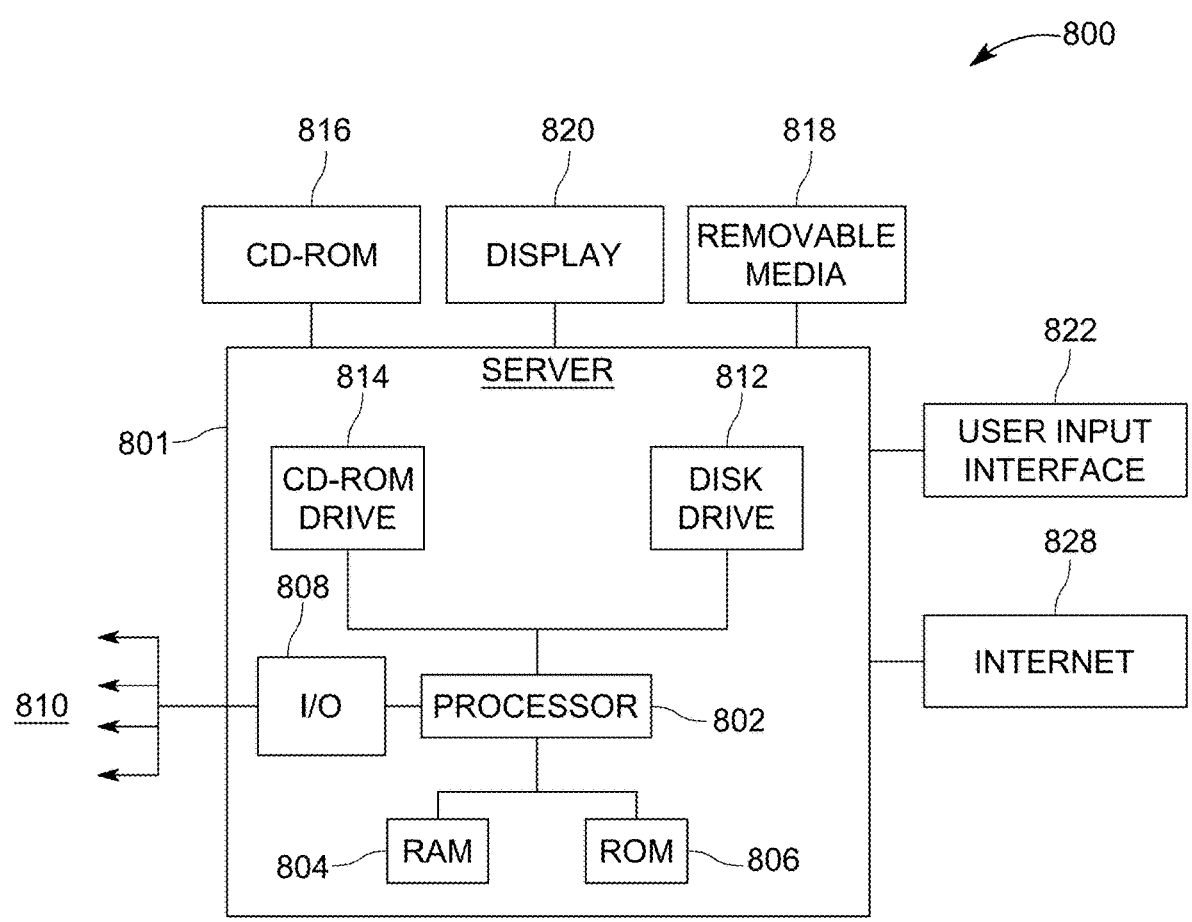
FIG. 8 is a schematic diagram of a computing device configured to implement one or more of the methods discussed herein.

The above-discussed procedures and methods may be implemented in a computing device as illustrated in FIG. 8. Hardware, firmware, software or a combination thereof may be used to perform the various steps and operations described herein. A computing device 800 suitable for performing the activities described in the exemplary embodiments may include a server 801. Such a server 801 may include a central processor (CPU) 802 coupled to a random-access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810 to provide control signals and the like. Processor 802 carries out a variety of functions as are known in the art, as dictated by software and/or firmware instructions.

Server 801 may also include one or more data storage devices, including hard drives 812, CD-ROM drives 814 and other hardware capable of reading and/or storing information, such as DVD, etc. In one embodiment, software for carrying out the above-discussed steps may be stored and distributed on a CD-ROM or DVD 816, a USB storage device 818 or other form of media capable of portably storing information. These storage media may be inserted into, and read by, devices such as CD-ROM drive 814, disk drive 812, etc. Server 801 may be coupled to a display 820, which may be any type of known display or presentation screen, such as LCD, plasma display, cathode ray tube (CRT), etc. A user input interface 822 is provided, including one or more user interface mechanisms such as a mouse, keyboard, microphone, touchpad, touch screen, voice-recognition system, etc.

Server 801 may be coupled to other devices, such as sources, detectors or receivers, seismic data storage facilities, etc. The server may be part of a larger network configuration as in a global area network (GAN) such as the Internet 828, which allows ultimate connection to various landline and/or mobile computing devices. The computing device or computing apparatus 800 can be configured to implement any of the above-discussed procedures and methods, including combinations thereof.

The disclosed embodiments provide a computing device, software instructions and a method for seismic data processing that takes into account not only the acoustic properties of the earth, but also its elastic properties. It should be understood that this description is not intended to limit the invention. On the contrary, the exemplary embodiments are intended to cover alternatives, modifications and equivalents, which are included in the scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Shen, X., I. Ahmed, A. Brenders, J. Dellinger, J. Etgen, and S. Michell, 2017, Salt model building at Atlantis with full-waveform inversion: 87th Annual International Meeting, SEG, Expanded Abstracts, 1507-1511.
[2] Michell, S., X. Shen, A. Brenders, J. Dellinger, I. Ahmed, and K. Fu, 2017, Automatic velocity model building with Complex salt: Can computers finally do an Interpreter's job?: 87th Annual International Meeting, SEG, Expanded Abstracts, 5250-5254.
[3] Zhang, Z., J. Mei, F. Lin, R. Huang, and P. Wang, 2018, Correcting for salt misinterpretation with full-waveform inversion: 88th Annual International Meeting, SEG, Expanded Abstracts, 1143-1147.
[4] Wang, P., Z. Zhang, J. Mei, F. Lin, and R. Huang, 2019, Full-waveform inversion for salt: A coming of age: The Leading Edge, 38(3), 204-213.
[5] Nolte, B., F. Rollins, Q. Li, S. Dadi, S. Yang, J. Mei, and R. Huang, 2019, Salt velocity model building with FWI on OBN data: Example from Mad Dog, Gulf of Mexico: 89th Annual International Meeting, SEG, Expanded Abstracts, 1275-1279.
[6] Zhang, Z., Z. Wu, Z. Wei, J. Mei, R. Huang, and P. Wang, 2020, FWI Imaging: Full-wavefield imaging through full-waveform inversion: 90th Annual International Meeting, SEG, Expanded Abstracts, 656-660.
[7] Huang, R., Z. Zhang, Z. Wu, Z. Wei, J. Mei, and P. Wang, 2021, Full-waveform inversion for full-wavefield imaging: Decades in the making: The Leading Edge, 40(5), 324-334.
[8] Mora, P., and Z. Wu, 2018, Elastic versus acoustic inversion for marine surveys: Geophysical Journal International, 214(1), 596-622.
[9] Agudo, O. C., N. V. da Silva, G. Stronge, and M. Warner, 2020, Mitigating elastic effects in marine 3-d full-waveform inversion: Geophysical Journal International, 220 (3), 2089-2104.
[10] Plessix, R.-E., and T. Krupovnickas, 2021, Low-frequency, long-offset elastic waveform inversion in the context of velocity model building: The Leading Edge, 40(5), 342-347.
[11] U.S. Pat. No. 11,048,001.

What is claimed is:

1. A method for seismic imaging of a subsurface using a full waveform inversion, FWI, the method comprising:
   obtaining an initial P-velocity model that describes how a seismic wave propagates through the subsurface;
   generating an S-velocity model based on the initial P-velocity model;
   generating an elastic synthetic dataset p based on the initial P-velocity model and the S-velocity model;
   receiving a recorded seismic dataset d of the subsurface;
   updating the P-velocity model based on a comparison between the synthetic dataset p and the recorded seismic dataset d;
   updating a reflectivity at various locations in the subsurface based on the updated P-velocity model; and
   generating an image of the subsurface based on the reflectivity.

2. The method of claim 1, further comprising:
   updating the S-velocity model based on the updated P-velocity model and updated reflectivity,
   wherein the synthetic dataset p includes pressures.

3. The method of claim 1, wherein the elastic synthetic dataset p is calculated based on Hooke's law, which links a stress vector describing the subsurface to a strain vector that describes the subsurface.

4. The method of claim 1, wherein the elastic synthetic dataset p is calculated based on (1) a stress vector describing the subsurface and (2) a strain vector describing the subsurface.

5. The method of claim 1, wherein the elastic synthetic dataset p is calculated based on an elastic wave equation.

6. The method of claim 1, wherein the elastic synthetic dataset p is equal to an average of the first three diagonal terms of the stress vector for the subsurface.

7. The method of claim 1, further comprising:
   updating the initial P-velocity model with a cost function based on time-shifts between the elastic synthetic dataset p and the recorded seismic dataset d.

8. The method of claim 7, wherein the cost function is a sum of squared time-shifts multiplied by weighs c, respectively, for all sources r and all sensors s for given windows w, which are frequency-dependent time windows.

9. The method of claim 1, further comprising:
   generating an adjoint source dataset using the cost function;
   calculating a gradient using the adjoint source dataset; and
   updating the initial P-velocity model based on the gradient.

10. The method of claim 1, further comprising:
    measuring time-shifts between the elastic synthetic dataset p and the recorded seismic dataset d;
    calculating correlation coefficients between the elastic synthetic dataset p and the measured dataset d;
    applying the correlation coefficients to weight the measured time-shifts;

generating an adjoint source dataset based on weighted time-shifts;
calculating a gradient using the adjoint source dataset; and
updating the initial P-velocity model based on the gradient.

11. A computing device for seismic imaging of a subsurface using a full waveform inversion, FWI, the computing device comprising:
an interface configured to receive an initial P-velocity model that describes how a seismic wave propagates through the subsurface; and
a processor connected to the interface and configured to,
generate an S-velocity model based on the initial P-velocity model;
generate an elastic synthetic dataset p based on the initial P-velocity model and the S-velocity model;
receive a recorded seismic dataset d of the subsurface;
update the P-velocity model based on a comparison between the elastic synthetic dataset p and the recorded seismic dataset d;
update a reflectivity at various locations in the subsurface based on the updated P-velocity model; and
generate an image of the subsurface based on the reflectivity.

12. The computing device of claim 11, wherein the processor is further configured to,
update the S-velocity model based on the updated P-velocity model and the updated reflectivity,
wherein the elastic synthetic dataset p includes pressures.

13. The computing device of claim 11, wherein the elastic synthetic dataset p is calculated based on the Hooke's law, which links a stress vector describing the subsurface to a strain vector that describes the subsurface.

14. The computing device of claim 11, wherein the elastic synthetic dataset p is calculated based on (1) a stress vector describing the subsurface and (2) a strain vector describing the subsurface.

15. The computing device of claim 11, wherein the elastic synthetic dataset p is calculated based on an elastic wave equation.

16. The computing device of claim 11, wherein the elastic synthetic dataset p is equal to an average of the first three diagonal terms of the stress vector for the subsurface.

17. The computing device of claim 11, wherein the processor is further configured to:
update the initial P-velocity model with a cost function based on time-shifts between the elastic synthetic dataset p and the recorded seismic dataset d,
wherein the cost function is a sum of squared time-shifts multiplied by weighs c, respectively, for all sources r and all sensors s for given windows w, which are frequency-dependent time windows.

18. The computing device of claim 11, wherein the processor is further configured to:
generate an adjoint source dataset using the cost function;
calculate a gradient using the adjoint source dataset; and
update the initial P-velocity model based on the gradient.

19. The computing device of claim 11, wherein the processor is further configured to:
measure time-shifts between the elastic synthetic dataset p and the recorded seismic dataset d;
calculate correlation coefficients between the elastic synthetic dataset p and the measured dataset d;
apply the correlation coefficients to weight the measured time-shifts;
generate an adjoint source dataset based on weighted time-shifts;
calculate a gradient using the adjoint source dataset; and
update the initial P-velocity model based on the gradient.

20. A non-transitory computer readable medium including computer executable instructions, wherein the instructions, when executed by a processor, implement a method of seismic imaging of a subsurface using a full waveform inversion, FWI, the medium comprising instructions for:
obtaining an initial P-velocity model that describes how a seismic wave propagates through the subsurface;
generating an S-velocity model based on the initial P-velocity model;
generating an elastic synthetic dataset p based on the initial P-velocity model and the S-velocity model;
receiving a recorded seismic dataset d of the subsurface;
updating the P-velocity model based on a comparison between the synthetic dataset p and the recorded seismic dataset d;
updating a reflectivity at various locations in the subsurface based on the updated P-velocity model; and
generating an image of the subsurface based on the reflectivity.

* * * * *